United States Patent [19]

Erickson et al.

[11] Patent Number: 5,801,645
[45] Date of Patent: Sep. 1, 1998

[54] AUTOMATIC PAIRED LVDT PROBE BALANCING

[75] Inventors: Steven D. Erickson, Plymouth; Cecil Nelson, Chanhassen, both of Minn.

[73] Assignee: Allen-Bradley Company, Inc., Milwaukee, Wis.

[21] Appl. No.: 685,896

[22] Filed: Jul. 18, 1996

[51] Int. Cl.$^6$ ............................................. G08C 19/06
[52] U.S. Cl. ........................... 340/870.36; 340/870.04; 324/207.18
[58] Field of Search ................... 340/870.36, 870.04, 340/870.05, 870.16, 870.11; 324/207.18; 318/657

[56] References Cited

U.S. PATENT DOCUMENTS 4,904,921   2/1990   De Vito et al. ............... 323/264
5,087,866   2/1992   Smith ............................ 318/653

*Primary Examiner*—Jeffery Hofsass
*Assistant Examiner*—Andrew Hill
*Attorney, Agent, or Firm*—John M. Miller; John J. Horn

[57] ABSTRACT

The apparatus and method of the present invention overcome the difficulties of balancing paired LVDT probes via provision of a quick and inexpensive process that can be implemented in either hardware or software. In particular, a software method is provided for determining a balance correction factor for paired probes in a LVDT gauging system. The balance correction factor is found through a procedure in which an operator moves a part under measurement within a fixture to which the probes are installed. The balance correction factor is then used to mathematically normalize A/D counts from individual paired probe circuits into a single result for each pair.

6 Claims, 4 Drawing Sheets

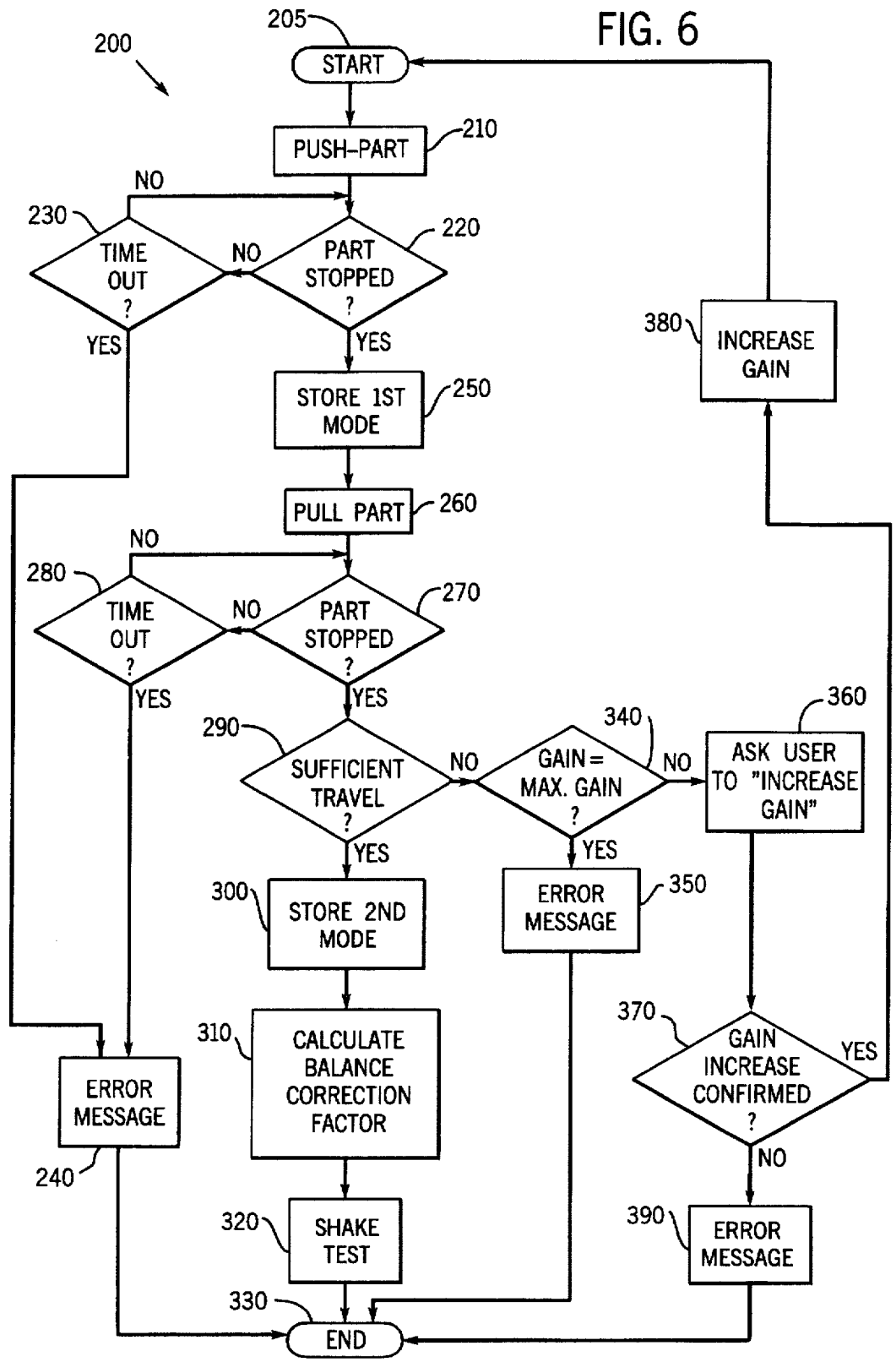

1

AUTOMATIC PAIRED LVDT PROBE BALANCING

FIELD OF THE INVENTION

This invention relates to balancing probes used for making precision measurements and more particularly, to an improved apparatus and method for automatically balancing paired linear variable differential transformer probes.

BACKGROUND OF THE INVENTION

Linear variable differential transformer (LVDT) probes are used to make precision measurements when implementing statistical process control (SPC) especially in industrial processes. An LVDT probe produces an electrical output proportional to the displacement of a separate moveable core. In general, an LVDT probe comprises a non-contacting magnetic inner core surrounded by a primary coil and two identical secondary coils symmetrically spaced about the primary coil. In use, an AC voltage is applied to the primary coil and the two secondary coils are connected externally in a series-opposing circuit (see generally FIG. 2). Accordingly, motion of the non-contacting magnetic core varies the mutual inductance between the primary coil and each secondary coil which in turn varies the voltage induced on each secondary by the primary. When the core is centered between the secondary windings, the voltage induced in each secondary is identical and 180 degrees out of phase and there is no net output. However, when the core is moved off center, the mutual inductance of the primary with one secondary is greater than the other which causes a differential voltage to appear across the secondaries in series. For off-center displacements within the range of operation, the output voltage is essentially a linear function of displacement. Hence, physical measurements may be determined as a function of output voltage.

LVDT probes are popular because there is no physical contact between the core and the coil which decreases the mechanical wear and extends the probes useful lifetime. Additionally, the corresponding absence of friction gives high resolution which in combination with a small core mass yields superior response capabilities for dynamic measurements as compared with other measurement techniques. Additionally, LVDT probes are not affected by mechanical overload which further increase their reliability.

In certain applications LVDT probes are paired together. In these instances the outputs of each probe are combined to yield a single measurement. However, when deriving a single measurement from opposing LVDT probes measurement errors can occur due to sensitivity variations of each probe. As a result, the output of paired LVDT probes must be balanced such that identical physical displacements produce outputs of equal magnitude. Existing methods for accounting for probe sensitivity variations involve trial and error procedures for electronically adjusting the analog gain of the probes. Specifically, FIG. 3 illustrates an existing method for balancing paired probes in which an analog correction factor is implemented. As shown, the output of each paired probe A and B is fed into a potentiometer which is adjusted such that the magnitude of the output voltage for each probe is equal for identical physical displacements. However, this method of analog balancing paired probes can be time consuming. In particular, when several paired probes are mounted within a single fixture several multi-turn potentiometers both course and fine are employed, all of which require centering and tuning. Accordingly, the process of balancing paired probes can be time consuming. Yet another limitation resultant from analog paired probe balancing is that individual probe data (i.e. "A" and "B") is lost and thus differential measurements such as [A–D] or [B–D] cannot be determined.

Yet another method to reduce measurement errors related to gain variations is to require more stringent manufacturing specifications such that gain variations from probe to probe are minimized or to find through inspection probes with matched gains. However, these methods are either time consuming and/or increase the cost of implementing paired probe measurements. In light of the aforementioned considerations, there is a present need for a method of balancing paired LVDT probes that is both quick and inexpensive which permits the use of lower quality and hence less expensive probes when implementing a paired probe LVDT gauging system.

SUMMARY OF THE INVENTION

The apparatus and method of the present invention overcome the difficulties of balancing paired LVDT probes via provision of a quick and inexpensive balancing method that can be implemented in either hardware or software. In particular, a method is provided for determining balance correction factors for paired probes in an LVDT gauging system. Thereafter, the balance correction factors are implemented to mathematically normalize A/D counts for individual paired probe circuits.

The apparatus and method of the present invention require that an operator physically push a part within a fixture in which the paired LVDT probes are mounted. During this time the A/D converter samples each of the paired probes analog outputs while an algorithm within the software detects when the part has stopped moving, taking into account the speed and acceleration at which the probes have traveled. When the part has stopped moving, the statistical mode of the A/D readings for each of the paired probes are calculated and stored. The operator is then prompted to pull the part within the fixture. As before, the stop detection algorithm determines when the part has stopped moving at the second extreme. Additionally, a check is performed to ensure that a sufficient number of digital bits are generated to accurately calculate the balance correction factor. When the part has stopped and a minimum number of digital bits are generated the statistical modes for each paired probe at the second extreme are calculated and stored. A balance correction factor is then determined as the ratio of the range of digital bits traversed by one probe of a pair over the range of digital bits traversed by the other probe of the pair. Thereafter, the balance correction factor is used along with master values input by the operator to determine the number of engineering units per A/D bit.

It is therefore an object of the present invention to provide a quick method for balancing paired LVDT probes.

It is a further object of the present invention to provide an automated method for balancing paired LVDT probes.

It is another object of the present invention to provide a digital domain method for balancing paired LVDT probes.

It is yet another object of the present invention to provide a method for balancing paired LVDT probes which preserves individual probe information.

It is still another object of the present invention to provide a method for balancing low cost mismatched paired LVDT probes.

BRIEF DESCRIPTION OF THE DRAWINGS

FIG. 6 is a flow chart illustrating the improved method of balancing paired LVDT probes in accordance with the preferred embodiment of the present invention.

DETAILED DESCRIPTION OF THE PREFERRED EMBODIMENT

Figure 1:
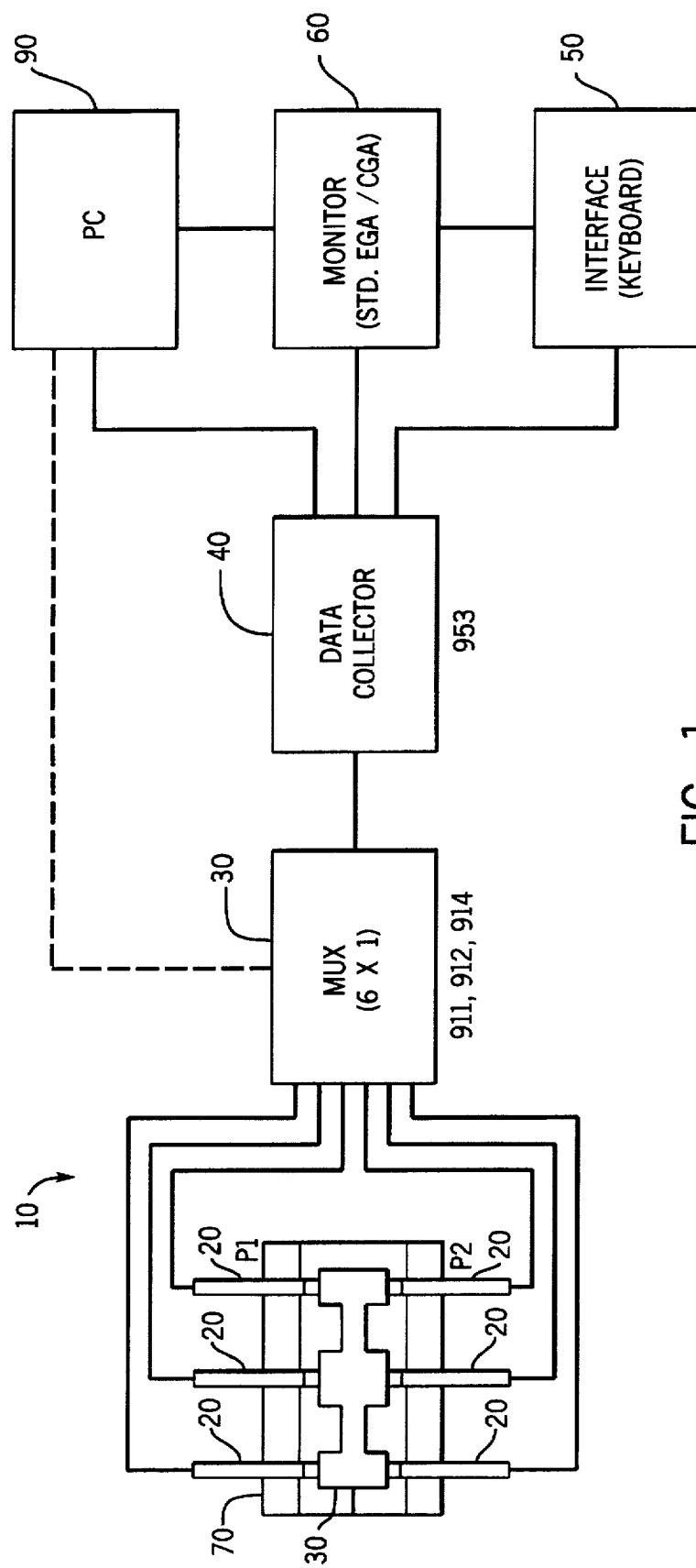
FIG. 1 is a schematic view of an LVDT gauging system in accordance with the preferred embodiment of the present invention.

With reference to FIG. 1 there is shown an improved LVDT gauging system 10 which implements the improved method of balancing paired LVDT probes in accordance with the present invention. The gauging system 10 comprises in part several paired LVDT probes 20, a multiplexer 30, a data collector 40, a man-machine interface (MMI) 50 and a monitor 60. As shown, a plurality of paired LVDT probes 20 are securely mounted within a fixture 70 such that the probes may engage a part 80 which is inserted within the fixture for measurement purposes and subsequently removed. For external wiring reduction purposes the paired LVDT probes 20 are connected to a multiplexer (MUX) 30 which has N inputs and one output. The output of multiplexer 30 may be fed to a data collector 40 or a personal computer (PC) 90 or both. Data collector 40 stores values measured by the LVDT probes 20 and is capable of performing basic statistical functions upon the collected data for implementing statistical process control. Alternatively, the data collection and statistical functions performed by data collector 40 may be implemented in software on PC 90 and in some cases both the data collector 40 and PC 90 are both used when complex reports need be generated. Additionally, a monitor 60 and interface 50 are used to interface with data collector 40 especially when a PC is not employed.

Figure 2:
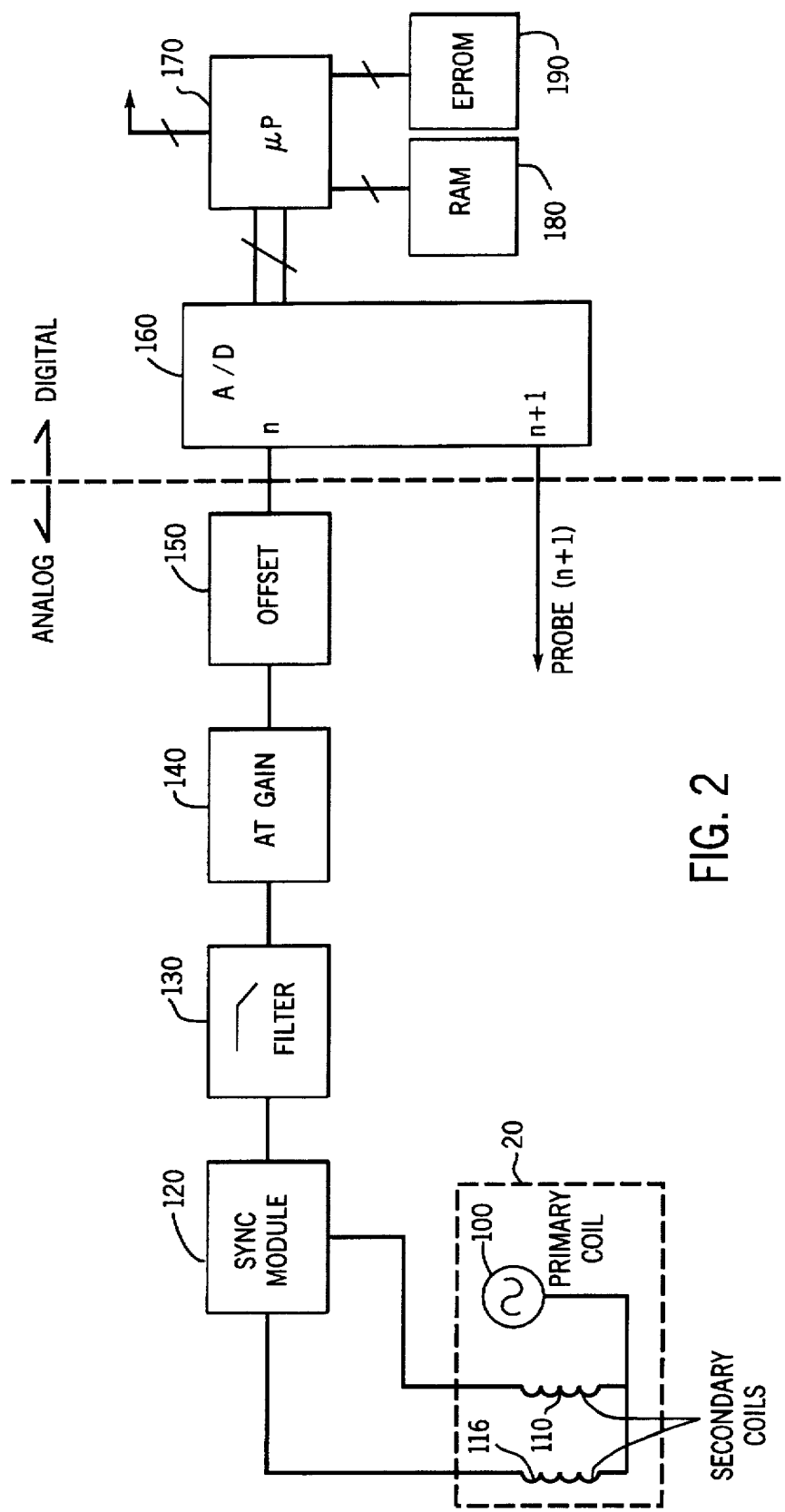
FIG. 2 is a schematic view of the analog and digital elements of the LVDT gauging system in accordance with the preferred embodiment of the present invention.
Figure 3:
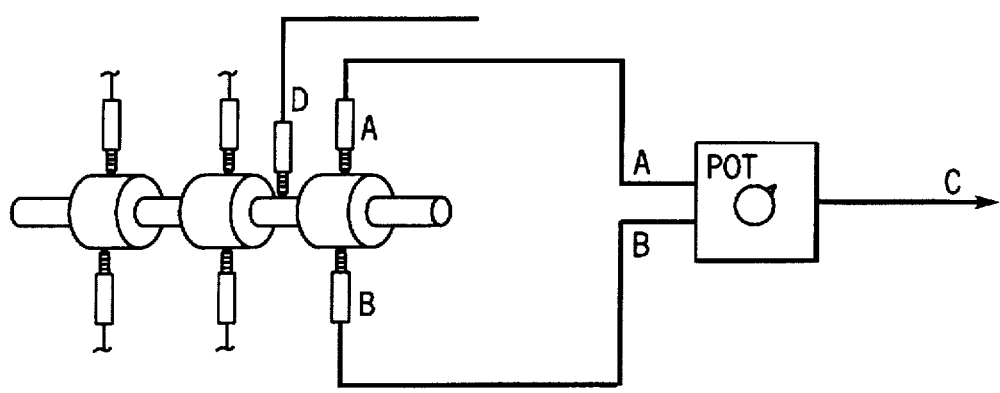
FIG. 3 is diagrammatic view of a prior art method for balancing paired LVDT probes.
Figure 4:
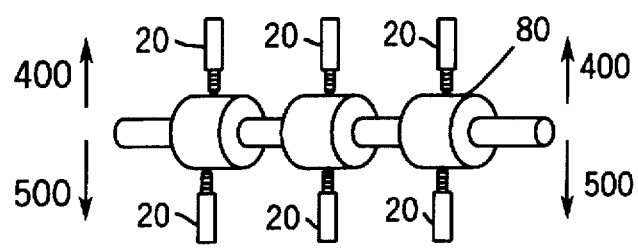
FIG. 4 is a perspective view of paired LVDT probes mounted within a fixture in accordance with the preferred embodiment of the present invention.
Figure 5:
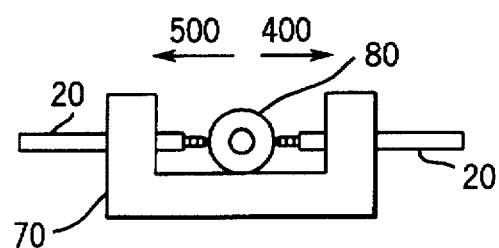
FIG. 5 is a side plan view of paired LVDT probes mounted in a fixture in accordance with the preferred embodiment of the present invention.

With reference to FIG. 2 there is shown the division between certain analog and digital elements employed in the LVDT gauging system 10. As shown, an analog voltage signal is applied across the primary coil 100 of the LVDT probe 20 which induces an analog voltage signal on secondary coils 110, the amplitude of the voltage depending upon the position of the core (not shown) which affects the mutual inductance between the primary coil 100 and each of the secondary coils 110. The analog voltages induced at each secondary are combined in the sync module 120 in a subtractive manner and an output analog voltage signal is generated which is linearly proportional to the measurement of part 80 placed in fixture 90. The analog output of sync module 120 is then passed through a low pass filter 130 to remove unwanted high frequency components, amplified in module 140 and offset in module 150 to correct for non-zero outputs generated when the probe is in a rest position. The sync module 120, filter 130, gain module 140 and offset module 150 may all be implemented within the multiplexer 30 shown in FIG. 1, however this is not required.

The analog output of offset module 150 is fed into an A/D converter 160 which generates a digital bit value proportional to the value of the analog voltage output from offset module 150. In the preferred embodiment, the A/D converter 160 has an operational range of 4096 digital bit values. However, the operational range of 4096 digital bit values is decreased in a practical environment by other considerations such as probe and amplifier saturation levels to yield a dynamic operational range of approximately 3600 digital bit values.

Also shown in FIG. 2 are random access memory (RAM) 180, electrically erasable programmable read only memory (EEPROM) 190 and microprocessor 170. In operation, microprocessor 200 executes a program stored in EEPROM 190 using variable inputs stored in RAM 180 and produces variable outputs which are also stored in the RAM 180. One program which may be stored in EEPROM 190 comprises the method of balancing paired LVDT probes.

Paired Probe Balancing

In accordance with the present invention, the balance correction factor ratio for paired probes is the ratio of the A/D bit range of one paired probe over the A/D bit range of the other probe of the pair when both of the probes are displaced by the same number of engineering units (i.e. the same physical distance). For the purposes of this specification the term "bit" is meant to include a discrete value which is additively combined with other identical "bits" to yield an instantaneous digital value of an analog signal when converting from analog to digital domains. Accordingly, the correction factor α is expressed according to the equation shown below:

$$\alpha = AD1b/AD2b$$

where:

AD1b=number of digital bits generated during the displacement of probe P1; and

AD2b=number of digital bits generated during the identical displacement of probe P2.

In general, the balancing process starts with arbitrarily selecting one probe of a pair and identifying that probe as ideal. Thereafter, both probes of the pair P1 and P2 are displaced the same number of engineering units. The A/D bit range of each probe is recorded during the time the probes are being displaced. These ranges are called AD1b and AD2b and the ratio of AD1b over AD2b is α. The ratio α is then used to normalize the digital values sampled from the analog probe outputs such that the digital values are of equal magnitude for identical probe displacements. In the preferred embodiment α has a default value of 1.0 and generally does not exceed 1.0±0.1 after balancing the paired probes.

With reference to FIG. 6, an improved method 200 for balancing paired LVDT probes is shown in flow chart form. The method begins at start block 205 which is initiated by an operator. Upon initiation, the method advances to process step 210 in which the operator is prompted to push part 80 within the fixture 70. In response, the operator physically moves the part 80 in a first direction 400 to one extreme within the fixture 70. During this time the A/D converter 160 samples each of the paired probes 20 outputs and generates a plurality of digital bits which are representative of the probes sampled analog output voltage. Eventually, the part will be restrained from further movement by the confines of fixture 70 at which time the part 80 will stop moving. In reality, however, slight movements or "jitter" may occur in the digital output of the A/D converter due to irregularities in the fixture or movements by the operator. Accordingly, the method employs a stop detection algorithm which monitors the output of the A/D converter 160 through a window which is 16 bits wide (16 bins). Specifically, the window starts off at the center of the 4096 possible bit values possible from the output of the A/D converter 160 and tracks the digital output of the converter at a rate of fifty (50) times per second. When the output of converter 160 exceeds the range of the window, the window is moved such that the highest output value recorded is the highest value in the window. While tracking the output of the converter 160, the number of hits in each of the 16 bins within the window is counted as the output of the A/D converter oscillates within the widow and when 1 bin has 10 or more times the number of hits than does the average number of hits of all other bins the part 80 is considered to be stopped. When the window moves because the digital output exceeded the range of the window all bin counts are reset. Additionally, if the part 80 has not stopped moving within a predetermined time period defined in decisional step 230 an error message is generated at process step 240 notifying the operator of such occurrence. On the other hand, when the part has stopped moving within the allotted time, the statistical mode of the A/D readings for each of the paired probes is stored in process step 250. In the present invention, the mode is simply the value of the bin that contained 10 or more times the number of hits than the average number of hits of all other bins in the window.

After the mode is stored in process step 250 the operator is prompted in step 260 to pull the part 80 within the fixture 70 at which time the operator moves the part 80 in a second direction 500 which is preferably 180 degrees from the first direction 400. Similar to process step 230, the stop detection algorithm is implemented at step 270 to determine whether or not the part 80 has stopped moving. As before, when the part has not stopped moving within the predetermined time period defined in decisional step 280 an error message is generated at process step 240 indicating an error message to the operator.

When the part 80 has stopped moving in direction 500 within the predetermined time period the number of number of digital bits generated over the push pull process is compared with a predetermined low number at process step 290. In the present invention, process step 290 checks to see if 150 or more digital bits are traversed between the push and pull process steps which ensures an accurate calculation of the balance correction factor α. In the case where an insufficient number of bits have been acquired, the method advances to decisional step 340 which checks to see if the maximum amount of gain has been applied to the analog probe signal in block 140 and if the maximum gain has already been applied an error message is generated at process step 350. Alternately, when the maximum gain has not been reached the operator is prompted to increase the gain at process block 360. Once confirmed by the operator at decisional block 370, the analog gain applied to each probe is increased at step 380 and the balancing process reverts to step 205 to restart the push-pull procedure. In the event the operator does not confirm the increase in gain an error message is generated at process step 390.

When the part 80 has stopped moving at the second extreme and a minimum number of bits are generated, the statistical mode at the second extreme is stored in process step 300. Thereafter the balance correction factor a is determined at step 310 as the ratio of the range digital bits generated from one probe (AD1b) over the range of digital bits generated by its paired probe (AD2b) as set forth in the equations above. Once the balance correction factor has been calculated at process step 310 the operator is prompted to perform an optional "shake" in test and observe whether the measurements derived from the paired probes vary when the part is oscillated between the two extremes within the fixture. In operation, when the part 80 is shaken within fixture 70 there should be very little change in the combined balanced paired probe measurement given positive movement of one probe is offset by the negative movement of the paired probe. Upon completion of the "shake" test the balancing process ends at step 330. Alternately, the balancing process ends after an error message has been generated at one of steps 240, 350 or 390.

Mastering

Mastering is a separate procedure during which known "Master" parts are measured and the number of engineering units per digital bit is determined. When two point mastering is employed the equations shown below indicate the process by which the number of engineering units per bit is obtained. First, the "High Master" part is placed in the fixture and the number of digital bits generated by each LVDT probe is recorded. Additionally, the operator inputs the known value in engineering units for the "High Master" part. Next, the "Low Master" part is placed in the fixture and as before the number of digital bits generated by each LVDT probe is recorded. From the known "Master" values and recorded number of digital bits the number of engineering units per bit can be determined as follows:

$$EU1/Bit = (\text{High Master} - \text{Low Master}) / (AD1m + \alpha AD2m)$$

$$EU2/Bit = EU1/Bit * \alpha$$

where

AD1m=A/D bit difference between high and low master points on probe P1; and

AD2m=A/D bit difference between high and low master points on probe P2.

In combination with the correction factor derived by the improved method set forth herein, the mastering process provides a basis for translating between a digital valve and actual measurement in engineering units. Specifically, paired probe measurements are calculated in the following manner:

$$\text{Paired Probe Measurement} = (\text{Measured Bits on P1}) EU1/Bit + (\text{Measured Bits on P2}) EU2/Bit$$

The instant invention has been shown and described herein in what is considered to be the most practical and preferred embodiment. It is recognized, however, that departures may be made therefrom within the scope of the invention and that obvious modifications will occur to a person skilled in the art. In particular, the improved method of balancing paired LVDT probes can be applied simultaneously to all paired probes within the fixture, thereby simultaneously balancing all the paired probes. Additional, while the improved method disclosed herein is stored in EEPROM it can be implement in software and it is considered within the scope of this invention to do so.

We claim:

1. An improved method for balancing paired LVDT probes in an LVDT gauging system comprising a fixture and at least two LVDT probes, said method comprising the steps of:

displacing a part within a fixture such that a first LVDT probe and a second paired LVDT probe are displaced an equal physical distance;

generating a first analog output from said first LVDT probe;

generating a second analog output from said second, paired LVDT probe;

converting said first analog output into a first digital signal having a first signal magnitude;

converting said second analog output into a second digital signal having a second signal magnitude;

computing a balance correction factor as said first signal magnitude over said second signal magnitude; and multiplying said second digital signal by said balance correction factor.

2. The method for balancing paired LVDT probes as set forth in claim 1 further comprising a method for detecting when said part has stopped moving within said fixture, comprising:

tracking said first signal magnitude through a window comprising a plurality of bins;

determining at discrete intervals a particular bin within said plurality of bins having a value equal to said first signal magnitude; and determining a stop condition when at said discrete intervals said first signal magnitude equals are of said plurality of bin values at least ten times more than said first signal magnitude equals an average of all other bin values within said window.

3. An improved LVDT gauging system comprising:

a first LVDT probe, said first probe generating a first analog output;

a second, paired LVDT probe, said second probe generating a second analog output;

an A/D converter having an A/D input and an A/D output, said first and second analog outputs coupled to said A/D input, said A/D converter converting said first and second analog outputs into corresponding first and second digital outputs;

means for storing a program, said program comprising the steps of:

determining a first range of bits from said first digital output corresponding to a first displacement of said first LVDT probe;

determining a second range of bits from said second digital output corresponding to a second displacement of said second LVDT probe wherein said first displacement is identical to said second physical displacement;

determining a correction factor as said first range of bits over said second range of bits; and storing said correction factor for use as multiple to said second digital output.

means for processing said program steps coupled to said means for storing said program and said A/D converter.

4. The improved LVDT gauging system as set forth in claim 3 wherein said program further comprises a stop detection method, said method comprising:

tracking said first digital output through a window comprising a plurality of bins;

determining at discrete intervals a particular bin within said plurality of bins having a value equal to said first digital output;

determining a stop condition when at said discrete intervals said first digital output equals one of said plurality of bin values at least ten times more than said first digital output equals an average of all other bin values within said window.

5. The improved LVDT gauging system as set forth in claim 3 wherein said means for storing a program is an EEPROM.

6. The improved LVDT gauging system as set forth in claim 3 wherein said means for processing said program steps is a microprocessor.

* * * * *